June 25, 1929.  C. A. GOODSPEED  1,718,348
LOOSE LINK CONSTRUCTION
Filed March 18, 1925
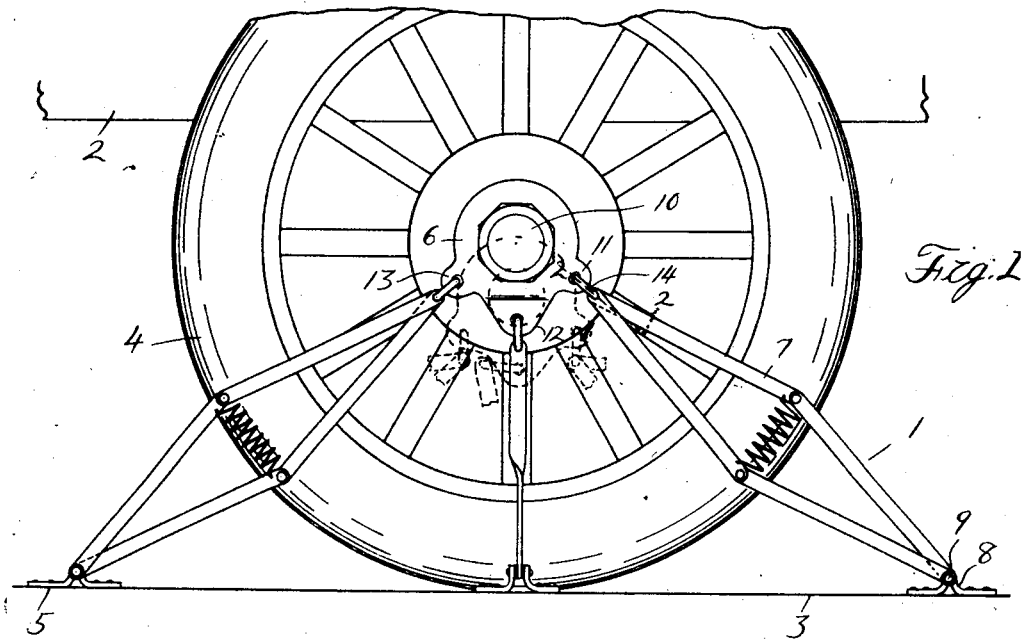
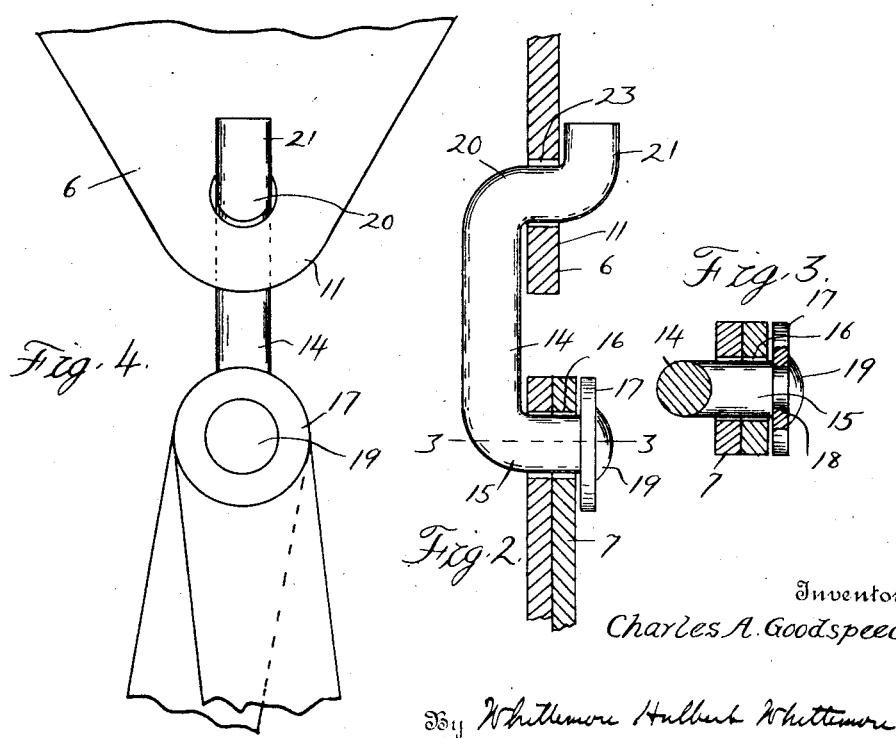
Inventor
Charles A. Goodspeed
By Whittemore Hulbert Whittemore
 Belknap
    Attorney Patented June 25, 1929.

1,718,348

UNITED STATES PATENT OFFICE.

CHARLES A. GOODSPEED, OF DETROIT, MICHIGAN, ASSIGNOR TO WILLIAM W. BLAKELEY, OF DEXTER, MICHIGAN.

LOOSE-LINK CONSTRUCTION.

Application filed March 18, 1925. Serial No. 16,533.

This invention relates generally to linkage and refers more particularly to links designed for connecting suitable tie members of vehicle anchorage devices to suitable adapter plates which are preferably mounted on the wheel hubs of the vehicle.

One of the essential objects of the invention is to provide a link of this type that is preferably permanently secured to the tie member and may be easily and quickly attached to or detached from the adapter plate.

Another object is to provide a link that is preferably loosely connected to the tie member and may be pivotally engaged with the adapter plate so that it will relieve the tie member of any undue stresses or strains should one or more tires of the vehicle become flat while in transit.

A further object is to provide a strong and durable link that is simple in construction and may be manufactured at a comparatively low cost.

With the above and other objects in view the invention consists in certain novel features of construction, combinations and arrangements of parts as will be more fully described and particularly pointed out in the appended claims.

In the accompanying drawing:

Figure 1 is a fragmentary side elevation of a motor vehicle with a hold down device embodying my link construction applied thereto and showing the adapter plate in various positions, the lower position represented by the dotted lines.

Figure 2 is a vertical sectional view taken on the line 2—2 of Figure 1.

Figure 3 is a sectional view taken on the line 3—3 of Figure 2.

Figure 4 is an enlarged portion of Figure 1.

Referring now to the drawing in which like characters of reference designate corresponding parts throughout the several views, the numeral 1 designates an anchorage device for holding merchandise such as a motor vehicle 2 upon a suitable support such as the floor 3 of a freight car while in transit.

An anchorage device of this type is preferably located opposite to each wheel 4 of the vehicle and preferably comprises suitable floor plates 5, an adapter plate 6 and the intermediate tie members 7. As shown, the floor plates 5 are preferably located in advance, in rear and to one side of each wheel and are preferably provided with upstanding lugs 8 to which the lower ends of the tie members 7 are preferably pivotally secured. Any suitable means such as the rivets 9 may be used for connecting the tie members to the lugs 8.

In order that the anchorage devices may be readily applied to the vehicle without marring its exterior finish, the adapter plate 6 is preferably detachably mounted on the wheel hub 10 of the vehicle and is provided at its lower edge with three spaced laterally extending apertured lugs 11, 12 and 13 respectively. To facilitate the attachment of the tie members 7 to the adapter plates 6, I preferably provide suitable links 14 that are preferably permanently secured to the upper ends of the tie members 7 and have a quick detachable connection with the lugs of the adapter plate 6. As shown, these links 14 are preferably substantially U-shape in form and have one arm 15 thereof extending loosely through suitable openings 16 in the tie members 7. After the arms 15 have been moved through the openings 16 in the tie members, suitable washers 17 are sleeved upon the reduced end portions 18 of the arms, after which heads 19 are preferably formed at the free ends of the arms to retain the washers in position.

The other arm 20 of each link 14 is preferably shorter than the arm 15 and is preferably provided at its free end with a short lateral finger 21 which extends beyond the arm 20 in a direction opposite to the arm 15 and is preferably in a plane that is substantially parallel to the straight intermediate portion 22 of the link.

Thus, with this construction, the tie members 7 may be readily attached to or detached from the adapter plate 6 by merely engaging or withdrawing the arms 20 and extensions 21 from the openings 23 in the lugs 11, 12 and 13 respectively of the adapter plate. Inasmuch as the arms 15 and 20 respectively of the links are loosely mounted in the tie members 7 and adapter plate 6, it will be readily apparent that this loose connection will relieve the tie members of any undue strains and stresses should one or more tires of the vehicle become flat in transit.

In use, the lugs 8 of the floor plates 5 and the arms 15 of the links 14 are secured first to the tie members 7, whereupon the adapter plates 6 are secured to the wheel hubs 10. The lateral extensions 21 of the link arms 20 are then moved through the openings 23 in the lugs of the adapter plate so that the extensions 21 engage the inner faces of the lugs, whereupon the floor plates 5 are secured to the floor.

Although I have shown and described a link 14 in connection with a vehicle anchorage device, it is readily apparent that it may be used in many different arts for connnecting different members together.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. A link comprising a member having substantially parallel arms, a substantially straight intermediate portion connecting said arms, an extension projecting laterally beyond one of said arms in a direction away from other of said arms and disposed in a plane substantially parallel to the plane of the intermediate portion, a washer sleeved on the second arm, and a head at the free end of the second arm holding the washer thereon.

2. A link for use with a tie member and adapter plate of a vehicle hold-down device comprising a member having substantially parallel arm portions, a substantially straight intermediate portion connecting said arm portion, an extension projecting laterally beyond one of said arm portions in a direction away from the other of said arm portions and disposed in a plane substantially parallel to the plane of the intermediate portion, the cross sectional area of said extension and adjacent arm portion being substantially the same so that the said adjacent arm portion may be received in an aperture of an adapter plate and so that said extension may constitute an abutment for such adapter plate, and a member upon the other arm portion at the free end thereof and constituting an abutment for a tie member.

3. A link for use with a tie member and adapter plate of a vehicle hold-down comprising a member having substantially parallel arm portions, a substantially straight intermediate portion connecting said arm portions at one end thereof, an extension projecting laterally beyond one of said arm portions and in a direction away from the other of said arm portions and disposed in a plane substantially parallel to the plane of the intermediate portion, the cross sectional area of said extension, arms and intermediate portion being substantially the same so that said parts may be moved through an aperture in a tie member and so that said extension and one of said arm portions may be moved in an aperture in an adapter plate, said extension constituting an abutment for an adapter plate when an arm portion adjacent thereto is received in the aperture in an adapter plate, and a washer fixed on the other arm portion and constituting an abutment for a tie member when the arm portion adjacent thereto is received in an aperture of the tie member.

In testimony whereof I affix my signature.

CHARLES A. GOODSPEED.